Figure 1:
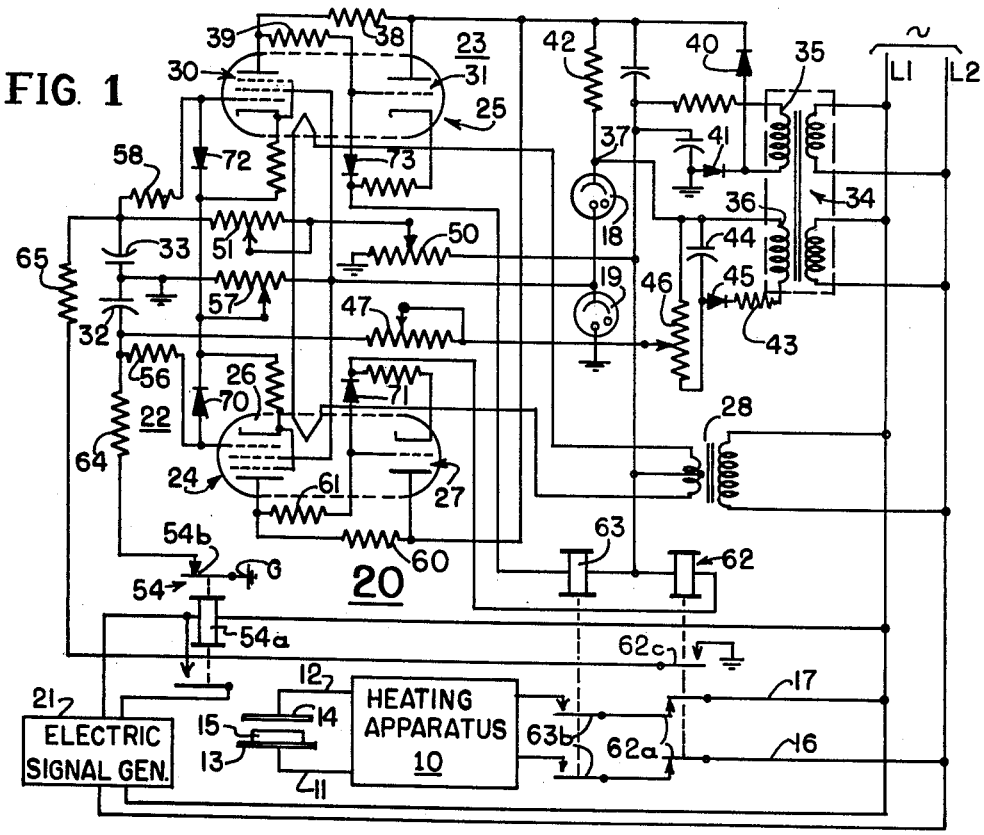

June 8, 1965 W. H. HICKOK 3,188,443
ELECTRONIC TIMING APPARATUS
Filed Feb. 1, 1962

INVENTOR.
WILLARD H. HICKOK
BY
Atty.

United States Patent Office 3,188,443
Patented June 8, 1965

3,188,443
ELECTRONIC TIMING APPARATUS
Willard H. Hickok, Louisville, Ky., assignor to Chemetron Corporation, Chicago, Ill., a corporation of Delaware
Filed Feb. 1, 1962, Ser. No. 170,330
13 Claims. (Cl. 219—10.77)

The present invention relates to electronic timing apparatus, and more particularly to electronic timing apparatus adapted for use in the heating of work.

Many heating applications require a rather precise quantity of energy to be delivered to a workpiece in a given period of time. For example, in the preheating of plastic molding material by dielectric heating, it is desirable to achieve a precise temperature in a given portion of the plastic material prior to the molding. Such heating operations are customarily performed every minute or so and it is highly desirable to have all preheats identical. This condition can be readily achieved if the line voltage supplying the dielectric heating equipment is perfectly constant.

However, in most molding plants having electrical energy supplied by public utility power lines the line voltage is subject to considerable variation. It has been determined that in dielectric heating systems the variations in the voltage of the heating electrodes is almost directly proportional to the variations in line voltage. Since the rate of delivered energy to heat the work is directly proportional to the electrode voltage squared, the variation in the temperature of the heated material will be approximately twice as great as the variation of the line voltage. In a plant where the line voltage is subject to normal fluctuation, it is very difficult to set up dielectric heating equipment to achieve optimum preheating without danger of overheating a certain proportion of the loads. Of course, a regulated power line could eliminate this difficulty. However, regulated power lines for applications with high power requirements are relatively expensive and therefore are not widely employed.

It is therefore an object of the present invention to provide for use with electrically energized heating apparatus improved means for compensating for voltage variations in a line voltage energy source for the heating apparatus by automatically controlling the amount of energy delivered to a workpiece by varying the time during which the heating apparatus is conected to its energy source.

In plants where plastic preforms are preheated to prepare them for molding operations it has been found advantageous to generate an electric current signal or pulse at a precise instant in the molding cycle preceding the time that the next heated preforms will be needed at the molding press to ensure that preforms at the correct temperature will be available at the proper time in the press sequence. For proper coordination of the preheating and molding operations, it is necessary that the interval between the signal generated in conjunction with the molding operation and termination of the preheat operations be constant. Provision must therefore be made for adjusting the duration of a delay or holding time interval between the signal and the beginning of the heating interval, in conjunction with means to control the amount of energy delivered to the work by adjusting the duration of the heating interval to compensate for line voltage variations. For example, the "start time" signal or pulse may be generated exactly 40 seconds prior to the time the heated preforms are required. If it is assumed that the dielectric heating time is 20 seconds for nominal line voltage, if line voltage increases by 10% the heat time will decrease 20%, that is, from 20 to 16 seconds. A device is therefore needed to increase the delay time from the nominal 20 seconds to 24 seconds so that the total of delay and heat time is 40 seconds. The converse is true should the nominal line voltage decrease.

It is therefore another object of the present invention to provide timing apparatus for adjusting the length of an interval during which energy is delivered to heat work to compensate for variations in line voltage, together with means to adjust a delay or holding time interval so that the sum total of delay and heat time intervals represents a predetermined fixed time interval.

Still another object is to provide improved timing apparatus adapted for use in the dielectric heating of work to deliver a precise amount of heat to the work despite variations in line voltage.

A further object is to provide improved delay timer means for use with dielectric heating apparatus connected to a varying line voltage source such that variations in line voltage control the duration of a delay time interval so that it complements the duration of a heat time interval whereby the sum of the delay and heat time intervals is constant.

Briefly stated, in accord with the illustrated embodiment of the present invention there is provided voltage sensitive electronic timing apparatus and a method for controlling the sequence cycle of heating apparatus for heating a workpiece comprising a circuit including a delay time section, a heat time section, and means to initiate the sequence cycle for the heating apparatus including a relay which opens contacts shorting a condenser in the delay time section on receiving an electric current signal or pulse from an external source. This permits the condenser which is associated with a control grid of an electron tube in the delay time section, to charge, increasing the potential on the grid until the tube section begins to conduct. The charging voltage for the condenser includes a constant voltage component, and another voltage component connected in opposition to it, which varies in proportion to the line voltage. The connection is such that the higher the line voltage, the longer the time required to charge the condenser to the potential at which the control grid will cause the tube section to conduct. The cathode voltage both for this tube section, and for the cathode of a corresponding tube section in the heat time section, is set at a common fixed potential which is a calculated percentage of the assumed normal charging voltage. When the tube section in the delay time section begins to conduct, the grid of a second tube section connected to the anode of the first mentioned tube section becomes less positive, biasing the second tube section to cut-off, and thereby interrupting current flow through an associated relay coil, thus operating contacts in the power supply circuit of the heating apparatus, and initiating the delivery of electrical energy to the heating apparatus, which, in turn, starts to heat a workpiece. The relay also opens other contacts in the heat time section permitting a condenser in that section to apply a charge to the grid of an electron tube section in the heat time portion of the circuit. The operation of this relay thus terminates the delay time interval and initiates the heat time interval. The charging voltage for the condenser in the heat time section is proportional to the line voltage. Therefore, in this instance, should the line voltage increase, the condenser will be charged quickly and the time of heat shortened. Conversely, should the line voltage drop, the condenser will charge at a slower rate and the heat-on time will be lengthened. When the positive potential of the grid reaches the cathode potential, the tube section goes into conduction, biasing an associated tube section to cut-off, thus deenergizing another relay having an operating coil connected to the cathode of the last mentioned tube section. This relay controls contacts in the power supply line of the heating apparatus to terminate delivery of heat energy to the work, ending the heat time interval and the cycle. As the delay time interval increases, and the heat time interval decreases with increase in line voltage, and conversely, the two intervals are complementary and the complete sequence cycle may be completed in a predetermined constant time interval.

Figure 2:
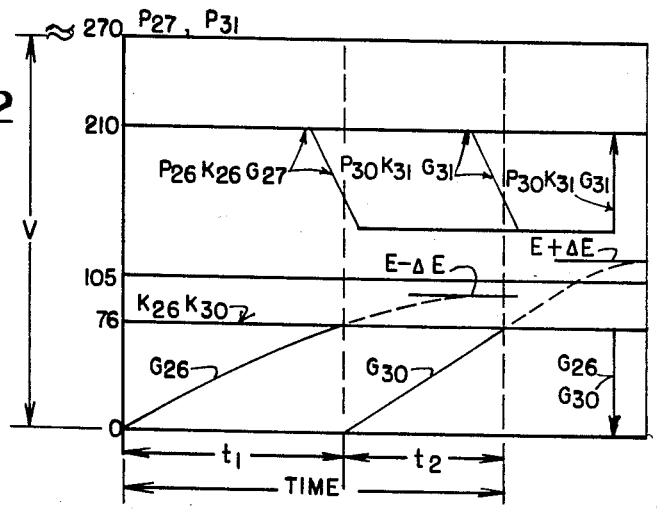

The invention, both as to its organization and method of operation, together with further objects and advantages, will best be understood by reference to the following description taken in connection with the accompanying drawing in which:

FIG. 1 diagrammatically illustrates the circuit for the electronic timing apparatus of the present invention; and FIG. 2 is a chart indicating typical voltages on the elements of the electron tubes of the circuit of FIG. 1 during a cycle.

Referring now to the drawing, and particularly to FIG. 1, the circuit comprises heating apparatus 10 (no details of which are shown) for example, of a conventional high frequency dielectric heating type, having a pair of lines 11 and 12 connected to spaced heating electrodes 13 and 14, for heating a workpiece consisting of a plastic preform dielectric load 15 by the high frequency field between the electrodes 13 and 14. The power supply or source for the heating apparatus 10 includes alternating current variable voltage supply lines $L_1$ and $L_2$ which may conveniently be 110 volt, 60 cycle public utility power lines. Interposed in lines 16 and 17, connecting heating apparatus 10 to $L_1$ and $L_2$, are relay contacts described in detail below which are operated by a voltage sensitive electronic timing apparatus circuit 20 to control the energization of heating apparatus 10 from the variable voltage power supply provided by lines $L_1$ and $L_2$.

Associated with heating apparatus 10 and timing apparatus circuit 20 is an electric current signal generator 21 having a sequence cycle associated therewith for generating an electric current signal at a precise instant in its cycle. Signal generator 21 may, for example, consist of electrical circuitry associated with a molding press (not shown) for molding plastic preforms such as preform 15.

The electronic timing apparatus circuit 20 includes a voltage sensitive delay time section 22 in which there is a dual electron tube 24, and a voltage sensitive heat time section 23 in which there is a dual electron tube 25. The tubes 24 and 25 may both be of the 6U8A dual type. Tube 24 includes a pentode section 26, and a triode section 27, and tube 25 includes a pentode section 30 and a triode section 31. The control grid of pentode section 26 is connected to condenser 32 so as to sense the quantity of charge on condenser 32, and the control grid of pentode section 30 is connected to condenser 33 so as to sense the quantity of charge on condenser 33.

For proper operation of the timing circuit 20 the cathode voltages of pentode sections 26 and 30 must be initially set a positive potential with respect to their control grids so that as the control grids go positive they intersect the cathode potential at a point on the exponential charging curve of condensers 32 and 33 where the slope is equal to apporixmately 2. This is necessary because the energy (G) delivered by conventional dielectric heating apparatus units such as heating apparatus 10 is a function of the line voltage ($E_0$) and the elapsed heat time. The relationship is such that $E_0^2 t$ should be a constant. This indicates that at the point of intersection the slope should be 2 as indicated above and in Equations 1 to 3 below:

(1) $\qquad G^2 t \approx E_0^2 t \approx K$ (2) $\qquad 2E_0 t + dE_0 + E_0^2 dt = 0 \qquad 2t dE_0 = -E_0 dt$ (3) $\qquad dE_0 = \dfrac{-E_0}{dt} dt$ The relationship of charging voltage vs. time is given in Equations 4 to 9 as follows:

(4) $\qquad E = E_0(1 - e^{-t/RC})$ (5) $\qquad 1 - E/E_0 = e^{-t/RC} = \phi \qquad (\phi = 1 - E/E_0)$ (6) $\qquad 1ge\phi = -t/RC$ (7) $\qquad t = -RC 1ge\phi$ (8) $\qquad dt = -RC d(1ge\phi) = -RC \dfrac{d\phi}{\phi}$ (9) $\qquad d\phi/dt = -\phi/RC$ The proper operating point for the cathode potential with respect to the normal charging voltage is determined as follows:

(10) $\qquad \phi = 1 - E/E_0 \qquad E/E = 1 - \phi$

(11) $\quad d\phi = E dE_0/E_0^2 = E/E_0 \qquad E_0/E_0 = (1-\phi) dE/E_0$

(12) $\quad d\phi = (1-\phi) E_0 (-E_0 dt/2t) = \dfrac{-(1-\phi)}{2t} dt$

(13) $\qquad\qquad d\phi dt = \dfrac{\phi - 1}{2t}$

(14) $\qquad\qquad -\phi/RC = \dfrac{\phi - 1}{2t}$

(15) $\qquad t = \dfrac{-(\phi-1)}{2C} RC = \dfrac{1-\phi RC}{2\phi} = -RC 1ge\phi$

(16) $\qquad\qquad \dfrac{1-\phi}{2\phi} = -1ge\phi$ (17)

| $\phi=$ | .60 | .40 | .30 | .25 | .28 | $\phi = .28$ |
|---|---|---|---|---|---|---|
| $-1ge\phi=$ | .51 | .91 | 1.20 | 1.38 | 1.27 | $E/E = .72$ |
| $\dfrac{1-\phi}{2\phi}=$ | .33 | .75 | 1.17 | 1.50 | 1.28 | $E = 72\% E_0$ |

The final solution indicates that the proper operating point occurs when the cathode potential is set at 72% of the normal charging voltage. If it is assumed that normal voltage is 105 volts, the cathode potential should be set at approximately 76 volts by properly setting an appropriately connected potentiometer in circuit 20 as described below.

The circuit 20 includes a transformer 34 having its primary connected to the variable voltage source supply lines $L_1$ and $L_2$. Another transformer, filament supply transformer 28, which may also be energized from variable voltage alternating current supply lines $L_1$ and $L_2$, energizes the series connected filaments of the tubes 24 and 25. The secondary of transformer 34 includes a pair of windings 35 and 36. A pair of voltage regulator tubes 18 and 19, and a dropping resistor 42 are connected in series across a rectified power supply of approximately 300 volts D.C. provided by rectifiers 40 and 41 associated with winding 35. The tubes 18 and 19 may both be of the OB2 type. A junction point 37 between resistor 42 and voltage regulator tube 18 thus provides a constant voltage component of 210 volts D.C. with respect to ground. In series with this voltage is a floating independent power supply which varies in direct proportion to the line voltage made up of transformer winding 36, a resistor 43, a condenser 44, and a rectifier 45. A voltage divider 46 is connected across this floating power supply. The polarity of the D.C. voltage component across resistor 46 is opposite to that of the 210 volt constant voltage component. Therefore it subtracts from the 210 volts at the junction 37 between resistor 42 and voltage regulator tube 18. The resistor 46 is adjusted at normal line voltage to subtract 105 volts, thus making available a net potential of plus 105 volts for charging condenser 32 through a variable resistor 47. It will be noted that if the line voltage should drop, less than 105 volts is subtracted by the resistor 46, therefore the net positive voltage for charging the condenser increases. Conversely, should the line voltage increase, less than 105 net positive volts is available for charging the condenser 32. The time for charging condenser 32 associated with delay time section 22 is thus in direct relationship with the magnitude of the line voltage.

The charging voltage for the heat time section of the circuit 20 is selected and adjusted by means of a potentiometer 50 which may be set at +105 volts for an assumed normal line voltage. This positive potential is used to charge condenser 33 through a variable resistor 51. As this positive potential is proportional to line voltage, should the line voltage increase, the condenser 33 will be charged faster and the heat-on time correspondingly shortened. Conversely, should the line voltage drop, the condenser 33 will charge at a slower rate and the heat-on time will be lengthened. Thus, the product of power times time becomes a constant, that is, the number of B.t.u.'s and the temperature obtained in the workpiece becomes constant. By proper setting of the variable resistors 47 in the delay time section, and 51 in the heat time section, the total elapsed time of delay time and heat time will be substantially constant.

In operation 110 volts, 60 cycle power is fed into the primary windings of transformers 28 and 34 from lines $L_1$ and $L_2$. A few minutes is required for warm-up of the tubes. At the instant of start, a coil 54a of a delay time control relay 54 is energized by electric current generated by generator 21. Until this instant a contact 54b of control relay 54 has been shorting condenser 32. Contact 54b is connected to one side of resistor 64 and to ground G. The energization of control relay 54 opens this shorting contact 54b breaking the connection to ground. The condenser 32 now begins to charge in a positive direction. The instantaneous charge voltage on condenser 32 is applied to the control grid of tube section 26 via a resistor 56. The cathodes of tube sections 26 and 30 are set as described above at a fixed positive potential of 76 volts, equal to 72% of the assumed normal charging voltage of 105 volts by way of a potentiometer 57 and a constant potential of 105 volts available from regulator tube 19. The grid of tube section 26 in delay time section 22 has thus started at much more negative potential and will increase in a positive direction as the condenser 32 charges. After sufficient time has elapsed to allow condenser 32 to charge and carry the grid of tube section 26 up to the cathode potential, the tube section 26 starts to conduct. The plate of tube section 26 therefore causes a voltage drop across a resistor 60 in a line connecting the plates of tube sections 26 and 27. This voltage is applied to the grid of tube section 27 via a resistor 61 causing it to become less positive. The cathodes of tube sections 27 and 31 are at a positive potential and pass their currents through coils of relays 62 and 63, respectively, relay 62 being normally closed, and relay 63 being normally open. When the potential on the grid of tube section 27 drops to the approximate potential of the cathode of tube section 27, the current flowing through the coil of relay 62 is cut off. It will be noted that diodes 70, 71, 72, 73 are used in connection with the respective tube sections 26, 27, 30 and 31 to prevent the grids from ever becoming positive with respect to their cathodes.

As tube section 31 is conducting at this time, its cathode current passes through the coil of relay 63, energizing it, holding its contacts in the circuit closed condition. Thus the interruption in the flow of current through the coil of relay 62 permits contacts 62a to close, establishing continuity in the circuit connecting the lines $L_1$ and $L_2$ to heating apparatus 10. This is the start of heating time. Another contact 62c controlled by the relay 62 until this time has been shorting the condenser 33. However, deenergization of the coil of relay 62 opens shorting contact 62c, permitting condenser 33 to charge in a positive direction. The instantaneous potential on the condenser 33 is applied through a resistor 53 to the grid of tube section 30. When this positive potential becomes approximately equal to the cathode potential of tube section 30, the tube section 30 goes into conduction. The plate of tube section 30 therefore causes a voltage drop across a resistor 38 in a line connecting the plates of tube sections 30 and 31. This voltage is applied to the grid of tube section 31 via a resistor 39, biasing tube section 31 to cut-off, thus deenergizing the coil of relay 63. Deenergization of the coil of relay 63 opens contacts 63b, in the lines connecting $L_1$ and $L_2$ to heating apparatus 10, interrupting power supply to the heating apparatus 10 and terminating heat time.

To reset the electronic timing apparatus circuit 20, control relay 54 is deenergized by termination of the flow of current from signal generator 21 as it completes a portion of its sequence cycle, thus discharging condenser 32 through resistor 64 and contacts 54b. This permits current to again flow through relay contact 62c which discharges condenser 33 through resistor 65 and contacts 62c. (The resistances 64 and 65 have relatively a small value as indicated below and their function is only to limit the magnitude of the discharge current.) This restores current through the coils of relays 62 and 63 and the timing apparatus is now returned to initial condition and is ready for the start of the next cycle, that is the energization of the relay 54 by a signal generated from generator 21.

The time chart shown in FIG. 2 shows typical voltages on the elements of the tubes during a cycle. On the time axis of the time chart of FIG. 2 $t_1$ represents the delay time interval, and $t_2$ represents the heat time interval. For the illustration the line voltage is assumed to be high. Therefore the voltage available for charging the condenser 32 is $E-$delta $E_0$, and the voltage available for charging the condenser 33 is $E+$delta $E_0$. $G_{26}$, $K_{26}$, and $P_{26}$ represent elements of tube section 26, and $G_{27}$, $K_{27}$, and $P_{27}$ represent elements of tube section 27. $G_{30}$, $K_{30}$, and $P_{30}$ are elements of tube section 30, and $G_{31}$, $K_{31}$, and $P_{31}$ are elements of tube section 31.

The following typical values of the circuit components for the embodiment of the invention of FIG. 1 are to be taken as illustrative and not by way of limitation.

| | |
|---|---|
| Condensers 32, 33 | 8 microfarads (each). |
| Condenser 44 | 10 microfarads—450 V. |
| Resistor 43 | 100 ohms. |
| Resistor 42 | 5000 ohms (7 W.). |
| Resistors 56, 63 | 250 K ohms (each). |
| Resistor 65 | 900 ohms. |
| Resistor 64 | 900 ohms. |
| Resistors 38, 39, 60 and 61 | 1 M ohm (each). |

The remaining circuit components have values adapted for the particular types of tubes in the circuit as will be understood by those skilled in this art.

The heating apparatus 10 is shown as being energized from lines $L_1$–$L_2$ which also supply power for the energization of electronic timing apparatus 20. However, it will be understood that the present invention can be employed in substantially the same manner in instances where the heating apparatus and its timing circuit are energized from separate varying AC voltage sources, and of different nominal voltages, as long as the variations in the line voltage of the separate sources are proportional.

As described above the control voltage for the energization of electronic timing apparatus 20 is supplied from the public utility power lines $L_1$–$L_2$. However, it will be understood that the present invention can also be employed in an arrangement in which the control voltage is obtained by rectifying a portion of the electrode voltage. This source of voltage may be more advantageous in certain applications.

Also, while the present invention has been described in conjunction with plastics preheating it will be apparent that the invention may be useful for many applications in dielectric heating as well as many applications which are not associated with dielectric heating.

While there has been described what is at present considered to be the preferred embodiment of the invention, it will be understood that various modifications may be made therein and are intended to be included within the scope of the appended claims.

What is claimed is:

1. Timing apparatus to control heating apparatus energized from a variable voltage source comprising means to initiate a timing cycle including a delay time interval and a heat time interval during which heat is applied to a workpiece, means to control the duration of the delay time interval, means to initiate the heat time interval on completion of the delay time interval, means to maintain continuous energization of the heating apparatus throughout the heat time interval to provide continuous application of heat to a workpiece, and voltage sensitive means to interrupt energization of the heating apparatus and end the heat time interval upon sensing of delivery of a preselected amount of heat energy to a workpiece, thereby to ensure delivery of constant total heat energy to each workpiece in spite of source voltage variations.

2. Timing apparatus as claimed in claim 1, in which the means to control the duration of the delay time interval is sensitive to changes in source voltage such as to directly relate the duration of the delay time interval to the magnitude of the source voltage, and the voltage sensitive means interrupts energization after a heat time interval of a duration which is inversely related to the magnitude of the source voltage, so that the duration of the timing cycle is a preselected constant in spite of source voltage variations.

3. Timing apparatus adapted to control a sequence cycle including a delay time interval and a complementary heat time interval for heating apparatus electrically energized from a variable voltage source, comprising means including a relay to initiate the cycle, first voltage sensitive means to provide a delay time interval of a duration which is directly related to the magnitude of the source voltage, said first voltage sensitive means including a first electron tube section having a grid and means for applying a net potential to said grid consisting of a voltage component which is constant and an opposite polarity voltage component which varies in proportion to the source voltage, means to actuate energization of the heating apparatus on completion of the delay time interval, and second voltage sensitive means to stop energization of the heating apparatus on completion of a heat time interval of a duration which is inversely related to the magnitude of the source voltage, said second voltage sensitive means including a second electron tube section having a grid and means for applying a potential thereto which is proportional to the source voltage, whereby the sequence cycle may be completed in a predetermined constant time interval.

4. A heating system comprising a variable A.C. voltage source for energizing heating apparatus, timing circuit means for use with heating apparatus to adapt it for connection to a variable voltage source including a condenser, a first electron tube section having a grid connected to sense the quantity of charge on said condenser, voltage sensitive means for charging said condenser to a predetermined potential at which said grid will cause said first tube section to conduct in a time interval having a duration related to the magnitude of said source voltage, a second electron tube section connected to said first electron tube section so that conduction in said second tube section is interrupted by the start of conduction in said first tube section, and a relay controlling the energization of said heating apparatus having its operating coil connected in series with the cathode of said second tube section.

5. Timing apparatus adapted to control a sequence cycle including a delay time interval and a complementary heat time interval for heating apparatus electrically energized from a variable voltage source, comprising means to initiate the cycle, first voltage sensitive means to provide a delay time interval of a duration which is directly related to the magnitude of the source voltage, said first voltage sensitive means including a first electron tube section having a cathode and a grid and means for applying a net potential to said grid consisting of a voltage component which is constant and an opposite polarity voltage component which varies in proportion to the source voltage, means to actuate energization of the heating apparatus on completion of the delay time interval, and second voltage sensitive means to stop energization of the heating apparatus on completion of a heat time interval of a duration which is inversely related to the magnitude of the source voltage, said second voltage sensitive means including a second electron tube section having a cathode and a grid and means for applying a potential to said grid which is proportional to the source voltage, the cathodes of said first and second electron tube sections being maintained at a common fixed positive potential, whereby the sequence cycle may be completed in a predetermined constant time interval.

6. Timing apparatus as claimed in claim 5, in which the respective means for applying potentials to the grids include condensers in each tube section, the slope of the charging curve of each condenser being approximately 2 at the point where the grid potential for the tube section becomes equal to its associated cathode potential.

7. In a heating system comprising a variable line voltage source, heating apparatus energized therefrom to heat a workpiece, and means for receiving an externally generated electric current signal, the combination therewith of timing apparatus for actuating a predetermined fixed duration sequence cycle for said heating apparatus comprising variable complementary delay time and heat time intervals, said timing apparatus including means responsive to an electric current signal to initiate the cycle, first voltage sensitive means to provide a delay time interval of a duration which is directly related to the magnitude of the source voltage, means to actuate energization of the heating apparatus at the conclusion of the delay time interval, and second voltage sensitive means to automatically vary the heat time interval during which heat energy is delivered to a workpiece by said heating apparatus to compensate for source voltage variations and provide a predetermined uniform final temperature in a workpiece.

8. A heating system comprising a variable A.C. voltage source for energizing heating apparatus, timing circuit means for use with heating apparatus to adapt it for connection to a variable voltage source including a first electron tube section having a grid, a first condenser for receiving a charge sensed by the grid of said first electron tube section, first voltage sensitive means for charging said condenser to a predetermined potential at which said first tube section grid will cause said first tube section to conduct in a time interval having a duration directly related to the magnitude of said source voltage, a second electron tube section connected to said first electron tube section so that conduction in said second tube section is interrupted by the start of conduction in said first tube section, a first relay for initiating the energization of said heating apparatus having its operating coil connected in series with the cathode of said second tube section, a third electron tube section having a grid, a second condenser for receiving a charge sensed by the grid of said third electron tube section, second voltage sensitive means for charging said condenser to a predetermined potential at which said third tube section grid will cause said third tube section to conduct in a time interval having a duration inversely related to the magnitude of said source voltage, a fourth electron tube section connected to said third electron tube section so that conduction in said fourth tube section is interrupted by the start of conduction in said third tube section, and a second relay for stopping the energization of said heating apparatus having its operating coil connected in series with the cathode of said fourth tube section.

9. A heating system comprising a variable A.C. voltage source for energizing heating apparatus, timing means for heating apparatus adapted for use with a variable voltage source including a condenser, a first electron tube section having a grid connected to said condenser so as to sense the quantity of charge on said condenser, voltage sensitive means for charging said condenser to a predetermined potential at which said grid will cause said first tube section to conduct in a time interval having a duration related to the magnitude of the source voltage, means including a first relay for initiating charge of said condenser, a second electron tube section connected to said first electron tube section so that conduction in said first tube section interrupts conduction in said second tube section, a second relay for connecting said voltage source to heating apparatus having its operating coil in series with the cathode of said second tube section, whereby the connection of said voltage source to said heating apparatus is actuated on completion of a delay time interval which is dependent upon the magnitude of the source voltage.

10. In timing apparatus adapted to control a sequence cycle for heating apparatus energized from a variable voltage source for heating a workpiece, means to connect the heating apparatus to a variable voltage source to initiate a heat time interval, and voltage sensitive means to disconnect the heating apparatus from the variable voltage source on completion of a heat time interval of duration inversely related to the magnitude of the source voltage so that a predetermined amount of energy is supplied to a workpiece during the heat time interval in spite of source voltage variations, said voltage sensitive means including a relay, and means for operating said relay including an electron tube section having a cathode maintained at a fixed positive potential, and a grid, and means including a condenser for increasing the potential on the grid in proportion to the magnitude of the source voltage, the slope of the charging curve of the condenser being approximately 2 at the point where the grid potential is equal to the cathode potential.

11. In combination with heating apparatus energizable from a variable voltage source for heating a workpiece, timing means to control a cycle for energizing said heating apparatus from a variable voltage source, said timing means including means for sensing variations in source voltage, and means responsive to variations in the source voltage to start energization of said heat apparatus at a precise instant in said cycle determined by the sensed voltage variations and maintain energization of said heating apparatus continuously for the remainder of said cycle, said means responsive to variations in the source voltage including an electron tube section having a cathode and a grid, and means for applying a net potential to said grid consisting of a voltage component which is constant and an opposite polarity component which varies in proportion to the source voltage, said cathode being maintained at a fixed positive potential, and said means for applying a net potential to said grid including a condenser having a charging curve the slope of which is approximately 2 at the selected operating point of the grid potential with respect to the cathode potential.

12. Timing apparatus adapted to control a cycle for heating apparatus energized from a variable voltage source comprising means to initiate the cycle, means to postpone energization of the heating apparatus for a desired interval after initiation of the cycle, means to connect the heating apparatus to a variable voltage source to initiate a heat time interval, and voltage sensitive means to disconnect the heating apparatus from the variable voltage source on completion of a heat time interval of duration inversely related to the magnitude of the source voltage so that a predetermined amount of electrical energy is supplied to the heating apparatus during the heat time interval in spite of source voltage variations, said voltage sensitive means including an electron tube section having a cathode maintained at a fixed positive potential, and a grid, and means including a condenser for increasing the potential on the grid in proportion to the magnitude of the source voltage.

13. Timing apparatus adapted to control a cycle for heating apparatus energized from a variable voltage source comprising means to initiate the cycle, means to postpone energization of the heating apparatus for a desired interval after initiation of the cycle, means to connect the heating apparatus to a variable voltage source to initiate a heat time interval, and voltage sensitive means to disconnect the heating apparatus from the variable voltage source on completion of a heat time interval of duration inversely related to the magnitude of the source voltage so that a predetermined amount of electrical energy is supplied to the heating apparatus during the heat time interval in spite of source voltage variations, said voltage sensitive means including an electron tube section having a cathode maintained at a fixed positive potential, and a grid, and means including a condenser for increasing the potential on the grid in proportion to the magnitude of the source voltage, said condenser having a charging curve the slope of which is approximately 2 at the selected operating point of the grid potential with respect to the cathode potential.

References Cited by the Examiner
UNITED STATES PATENTS

| | | | |
|---|---|---|---|
| 2,599,258 | 6/52 | Hoare | 323—69 X |
| 2,669,638 | 2/54 | Aversten | 219—108 |
| 2,868,940 | 1/59 | Jennings et al. | 219—10.77 |
| 2,868,941 | 1/59 | Hickok | 219—10.77 |
| 2,928,924 | 3/60 | Rueggelberg | 219—10.77 |

RICHARD M. WOOD, *Primary Examiner.*